United States Patent [19]

Wu

[11] Patent Number: 5,882,712
[45] Date of Patent: Mar. 16, 1999

[54] USE OF CALCIUM CHLORIDE AND MAGNESIUM CHLORIDE AS LEAVENING ACIDS FOR BATTER AND DOUGH COMPOSITIONS

[75] Inventor: Rei-Young Amos Wu, Palatine, Ill.

[73] Assignee: The Quaker Oats Company, Chicago, Ill.

[21] Appl. No.: 903,647

[22] Filed: Jul. 31, 1997

Related U.S. Application Data

[63] Continuation of Ser. No. 579,058, Dec. 26, 1995, abandoned.

[51] Int. Cl.$^6$ .................................................. A23L 2/40
[52] U.S. Cl. ........................ 426/551; 426/549; 426/552; 426/561; 426/562
[58] Field of Search ..................... 426/549, 551, 426/552, 391, 561, 562, 591

[56] References Cited

U.S. PATENT DOCUMENTS

| | | | |
|---|---|---|---|
| Re. 28,074 | 7/1974 | Smerak et al. | 426/20 |
| 3,034,899 | 5/1962 | Tucker | 99/95 |
| 3,620,763 | 11/1971 | Hans | 99/92 |
| 3,653,917 | 4/1972 | Wabba et al. | 99/94 |
| 3,713,845 | 1/1973 | Kuffel | 99/94 |
| 4,028,471 | 6/1977 | Krum et al. | 426/22 |
| 4,239,783 | 12/1980 | Wollermann et al. | 426/25 |
| 4,318,991 | 3/1982 | Hill | 435/245 |
| 4,328,115 | 5/1982 | Metz | 252/186 |
| 4,335,154 | 6/1982 | Benjamin et al. | 426/551 |
| 4,388,336 | 6/1983 | Young et al. | 426/551 |
| 4,404,227 | 9/1983 | Pomper | 426/19 |
| 4,436,758 | 3/1984 | Thompson | 426/549 |
| 4,495,214 | 1/1985 | Seltzer et al. | 426/557 |
| 4,504,510 | 3/1985 | Aliberto | 426/553 |
| 4,654,221 | 3/1987 | Purves et al. | 426/609 |
| 4,741,907 | 5/1988 | Furuhashi | 426/90 |
| 4,797,365 | 1/1989 | Pomper et al. | 435/256 |
| 4,859,473 | 8/1989 | Arciszewski et al. | 426/19 |
| 4,938,980 | 7/1990 | Arcisewski et al. | 426/553 |
| 4,966,782 | 10/1990 | Heidolph et al. | 426/551 |
| 5,064,661 | 11/1991 | Verduin | 426/26 |
| 5,153,018 | 10/1992 | Lajoie et al. | 426/551 |
| 5,225,225 | 7/1993 | Thomas et al. | 426/561 |
| 5,225,226 | 7/1993 | Thomas et al. | 426/561 |
| 5,431,719 | 7/1995 | Clapp et al. | 106/2 |

FOREIGN PATENT DOCUMENTS

| | | |
|---|---|---|
| 065668 | 3/1987 | Japan . |
| 034942 | 2/1993 | Japan . |

OTHER PUBLICATIONS

S. Lukas and F. LaBell: Fabricated Onion Rings have Homestyle Look and Mild Onion Flavor: *Food Processing*, Aug. 1983, 44(9), 26–27.
Betty Crocker's New Picture Cook Book, McGraw Hill Book Company, Inc., 1st Ed., (1961).

*Primary Examiner*—Lien Tran
*Attorney, Agent, or Firm*—Lars S. Johnson; Carolyn M. Sloane

[57] ABSTRACT

The use of calcium chloride, magnesium chloride, their hydrates, and mixtures thereof, as chemical leavening acids in the preparation of baked goods. Such chemical leavening composition is used in both batter compositions and dough compositions.

27 Claims, No Drawings

USE OF CALCIUM CHLORIDE AND MAGNESIUM CHLORIDE AS LEAVENING ACIDS FOR BATTER AND DOUGH COMPOSITIONS

This application is a continuation of application Ser. No. 08/579,058, filed on Dec. 26, 1995 now abandonded.

FIELD OF INVENTION

The present invention relates to the use of calcium chloride, magnesium chloride, and their hydrates, and mixtures thereof, as a leavening acid in a chemical leavening composition for use in batter and dough compositions. The calcium chloride, magnesium chloride, their hydrates, and mixtures thereof can be used as leavening acids in both batter and dough compositions. The present invention further relates to batter and dough compositions prepared using calcium chloride, magnesium chloride, their hydrates, and mixtures thereof, as leavening acids, and the method of leavening such batter and dough compositions.

BACKGROUND OF INVENTION

In the preparation of batter and dough compositions, leavening agents are typically used to increase the volume of the batter and dough compositions during cooking and/or baking. Different leavening agents are used for the preparation of different types batter and dough compositions. One type of leavening agent is a natural leavening agent such as yeast. Yeast acts with dough to increase the volume of the dough prior to baking the dough. Dough is often used to prepare products such as breads, doughnuts, bagels, rolls, etc.

Another type of leavening agent is a chemical leavening composition. Such chemical leavening composition comprises a leavening acid and a corresponding leavening base. The leavening acid reacts with the leavening base to evolve gas, typically $CO_2$. The evolved gas acts to increase the volume of the batter composition prior to and during cooking and/or baking. Such chemical leavening composition is used commercially in the preparation of batter compositions used to prepare food products such as doughnuts, pancakes, biscuits, cakes, cookies, muffins, cupcakes, hush puppies, etc.

There are numerous chemical leavening compositions known to those skilled in the art. Furthermore, there are numerous leavening acids used in such chemical leavening compositions. Known leavening acids include mono- and dicalcium phosphates, sodium aluminum sulfate, sodium acid pyrophosphate, sodium aluminum phosphate, potassium acid tartrate, fumaric acid, ammonium orthophosphate, glucono delta lactone, and various organic acids. While there are numerous leavening acids known to those skilled in the art, it would be desirable to identify a leavening acid which has a lower cost than known leavening acids, provides for better quality product, i.e., a product having better flavor, texture and appearance, and allows for easier application and more uniform distribution, i.e., mixes well with other ingredients and is easy to handle.

It would therefore by desirable to identify such a chemical leavening acid. The present invention provides for such a chemical leavening acid, which chemical leavening acid possess such properties.

BACKGROUND ART

Chemical leavening acids, and chemical leavening compositions, are known to those skilled in the art.

U.S. Pat. No. 3,034,899, issued May 15, 1962, to Tucker, discloses a composition of matter containing sodium acid pyrophosphate as a chemical leavening acid in combination with a edible calcium salt having a pH within the range of about 4.1 to about 10.0.

U.S. Pat. No. 4,388,336, issued Jun. 14, 1983, to Yong et al., discloses a dough formulation comprising a mixture of flour, water and shortening and at least one leavener including an organic acid leavener incorporated into the mixture, and at least one of a calcium divalent or trivalent compound and aluminum divalent or trivalent compound in an amount effective to reduce gumminess of less than 1% by weight of dough. The divalent or trivalent Ionic compounds used in this invention include calcium or aluminum ionic compounds, e.g., $CaCO_3$, calcium chloride or SALP or combinations thereof U.S. Pat. No. 4,436,758, issued Mar. 13, 1984, to Thompson, discloses a stable dough conditioning composition for addition in a concentrated form to yeast leavened dough to eliminate the need for the addition of ammonium salts to the dough. The claimed composition consists essentially of a solid organic acid, and a bromate salt comPatible with the acid.

U.S. Pat. No. 4,859,473, issued Aug. 22, 1989, to Arciszewski et al., discloses a process for producing a baked cracker, the process comprising forming a dough by mixing flour, water, fat or shortening, from about 40 to about 80 percent by weight of ammonium bicarbonate, from about 30 to about 10 percent by weight of potassium carbonate and from about 30 to about 10 percent by weight of an edible acidic component, the percentage being based upon the total weight of the ammonium bicarbonate, potassium carbonate and the acidic component. The dough is then baked, thereby causing the edible acidic compound to react with the potassium carbonate to form carbon dioxide and leaven the dough and baking the laminated dough, thereby forming the baked cracker.

U.S. Pat. No. 4,938,930, issued Jul. 3, 1990, to Arciszewski et al., discloses a low sodium cake mix comprising a shortening portion, a non-shortening portion and a leavening portion, the leavening portion comprising a basic leavening agent comprising potassium bicarbonate and an edible acidic leavening agent, such that, upon baking of the cake mix, the acidic leavening agent will react with the basic leavening agent to liberate carbon dioxide and thereby leaven the cake mix, the two types of leavening agents being present in such a balanced proportion that after baking the pH of the resultant cake product is in the range of about 6.8 to about 7.5.

U.S. Pat. No. 5,064,661, issued Nov. 12, 1991, to Verduin, discloses a method for making a low sodium sponge cracker good, said method comprising (a) preparing a sponge by a process comprising mixing sponge ingredients comprising flour, water, and yeast, and fermenting the mixture; (b) forming a cracker dough by a process comprising admixing the sponge with dough ingredients comprising flour and an alkaline leavening agent so as to form a cracker dough, the alkaline leavening agent added serving to control the pH of the dough by neutralizing acids produced during the fermentation and leavening of the dough, said alkaline leavening agent comprising potassium carbonate and potassium bicarbonate, the molar ratio of potassium carbonate to potassium bicarbonate in said alkaline leavening agent being in the range of from about 85:15 to about 50:50; and (c) baking the dough. The amount of potassium carbonate and potassium bicarbonate included in the dough is sufficient to extend the lay time of the dough whereby a pH of about 6.7 to about 8.0 is obtained in the baked sponge .good, even after a lay time of at least about 5 hours.

The art also discloses the use of calcium chloride in an angel food cake mix. U.S. Pat. No. 3,653,917, issued Apr. 4, 1972, to Wahba et al., discloses an angel food cake mix comprising sugar, a farinaceous material which is a chlorine bleached wheat flour having a pH of 3.0 to 4.5 and a protein content of 3.0 to 4.5% or a combination thereof with raw wheat starch, dehydrated egg whites, pregelatinzed starch, balanced chemical leavening and excess acidifier, the improvement comprising including calcium chloride as a part of such mix in an amount sufficient to increase the tolerance of the mix to variations in ingredient quality and amounts.

However, none of these references teach the use of calcium chloride, magnesium chloride, their hydrates, and mixtures thereof, as a leavening acid in a chemical leavening composition for use in batter and dough compositions. These references also fail to teach a method of chemically leavening a batter or dough by adding a chemical leavening acid selected from calcium chloride, magnesium chloride, their hydrates, and mixtures thereof, together with a basic compound which is selected from one or more of a group of compounds which, when reacted chemically with the leavening acid, are capable of generating carbon dioxide gas. Nor do any of the references teach a batter or dough composition which contains such leavening acid and basic compound. The references also fail to teach that the use of such a leavening acid selected from calcium chloride, magnesium chloride, their hydrates, and mixtures thereof, provides for a cost reduction, provides for a better quality product, and provides for an easier application and more uniform distribution.

It is therefore an object of the present invention to provide for a composition useful for leavening a batter or dough which comprises a leavening acid selected from the group consisting of calcium chloride, magnesium chloride, their hydrates, and mixtures thereof, and a basic compound, wherein said basic compound is selected from one or more of a group of compounds which, when reacted chemically with said leavening acid, are capable of generating carbon dioxide gas. It is another object of the present invention to provide a method of chemically leavening a batter or dough, which method comprises adding said chemical leavening acid selected from the group consisting of calcium chloride, magnesium chloride, their hydrates, and mixtures thereof, together with a basic compound selected from a group of compounds which, when reacted chemically with the leavening acid, are capable of generating carbon dioxide gas. It is still another object of the present invention to provide a batter or dough composition which comprises such leavening acid and basic compound.

These objects are accomplished by the invention described herein.

SUMMARY OF THE INVENTION

The present invention relates to a chemical leavening composition useful for leavening a batter or dough, which chemical leavening composition comprises from about 20% to about 50% by weight of a leavening acid selected from the group consisting of calcium chloride, magnesium chloride, their hydrates, and mixtures thereof, and from about 50% to about 80% by weight of a basic compound, wherein said basic compound is selected from one or more of a group of compounds which, when reacted chemically with said leavening acid, are capable of generating carbon dioxide gas, wherein the stoichiometric ratio of said leavening acid to said basic compound is in the range of from about 1:1.5 to about 1:2.5, and wherein said weight percentages are expressed as a percentage of the chemical leavening composition.

The present invention further relates to a method of chemically leavening a batter or dough, which method comprises adding a balanced chemical leavening system to said batter or dough in an amount sufficient to leaven said batter or dough, wherein said balanced chemical leavening system comprises a leavening acid selected from the group consisting of calcium chloride, magnesium chloride, their hydrates, and mixtures thereof, and basic compound is selected from a group of compounds which, when reacted chemically with said leavening acid, are capable of generating carbon dioxide gas, and wherein the stoichiometric ratio of said leavening acid to said basic compound is in the range of from about 1:1.5 to about 1:2.5.

The present invention further relates to a method of chemically leavening a batter, which method comprises preparing a batter comprising from about 0.04% to about 2% by weight of a leavening acid, and from about 0.05% to about 2.5% by weight of a basic compound, wherein said leavening acid is selected from the group consisting of calcium chloride, magnesium chloride, their hydrates, and mixtures thereof, wherein said basic compound is selected from one or more of a group of compounds which, when reacted chemically with said leavening acid, are capable of generating carbon dioxide gas, wherein the stoichiometric ratio of said leavening acid to said basic compound is in the range of from about 1:1.5 to about 1:2.5, and wherein all weight percentages are expressed as a weight percentage of said batter.

The present invention further relates to a method of chemically leavening a dough, which method comprises preparing a dough comprising from about 0.04% to about 2% by weight of a leavening acid and, from about 0.05% to about 2.5% by weight of a basic compound, wherein said leavening acid is selected from the group consisting of calcium chloride, magnesium chloride, their hydrates, and mixtures thereof, wherein said basic compound is selected from one or more of a group of compounds which, when reacted chemically with said leavening acid, are capable of generating carbon dioxide gas, wherein the stoichiometric ratio of said leavening acid to said basic compound is in the range of from about 1:1.5 to about 1:2.5, and wherein all weight percentages are expressed as a weight percentage of said dough.

The present invention further relates to a batter composition comprising from about 20% to about 50% by weight flour, and from about 30% to about 65% by weight water, wherein the improvement comprises from about 0.04% to about 2% by weight of a leavening acid, and from about 0.05% to about 2.5% by weight of a basic compound, wherein said leavening acid is selected from the group consisting of calcium chloride, magnesium chloride, their hydrates, and mixtures thereof, wherein said basic compound is selected from one or more of a group of compounds which, when reacted chemically with said leavening acid, are capable of generating carbon dioxide gas, wherein the stoichiometric ratio of said leavening acid to said basic compound is in the range of from about 1:1.5 to about 1:2.5, and wherein all weight percentage are expressed as a weight percentage of said batter composition.

The present invention further relates to a dough composition comprising from about 30% to about 70% by weight flour; from 0% to about 6% yeast; and from about 18% to about 45% by weight water, wherein the improvement comprises from about 0.04% to about 2% by weight of a leavening acid, and from about 0.05% to about 2.5% by weight of a basic compound, wherein said leavening acid is selected from the group consisting of calcium chloride, magnesium chloride, their hydrates, and mixtures thereof, wherein said basic compound is selected from a group of compounds which, when reacted chemically with said leavening acid, are capable of generating carbon dioxide gas, wherein the stoichiometric ratio of said leavening acid to said basic compound is in the range of from about 1:1.5 to about 1:2.5, and wherein all weight percentage are expressed as a weight percentage of said batter composition.

DETAILED DESCRIPTION OF THE INVENTION

The present invention claims a chemical leavening composition useful for leavening a batter or dough. The claimed chemical leavening composition comprises from about 20% to about 50%, preferably from about 25% to about 45%, more preferably from about 30% to about 40% by weight of a leavening acid, and from about 50% to about 80%, preferably from about 55% to about 75%, more preferably from about 60% to about 70% by weight of a basic compound. The above weight percentages are expressed as a percentage of the chemical leavening composition.

The chemical leavening composition of the present invention comprises a leavening acid and a basic compound, and is a balanced chemical leavening composition. By the term "balanced chemical leavening composition", it is meant that proper levels of the leavening acid and basic compound are present to substantially fully react with each other to generate carbon dioxide. The chemical leavening composition of the present invention will react to generate $CO_2$ gas in the presence of water prior to and during baking, i.e., under ambient conditions and the conditions of heat achieved during baking, e.g., dough temperatures in excess of 120° F. As will be appreciated by one skilled in the art, the weight percentages and the weight ratio of leavening acid to basic compound necessary to achieve a balanced chemical leavening composition will depend upon the particular leavening acid and basic compound used, and their stoichiometric ratio. Since this is a balanced leavening composition, the stoichiometric ratio of leavening acid to basic compound will be in the range of from about 1:1.5 to about 1:2.5, preferably from about 1:1.7 to about 1:2.3, more preferably from about 1:1.9 to about 1:2.1.

The leavening acid used in the claimed chemical leavening composition of the present invention is a Lewis acid and is selected from the group consisting of calcium chloride, magnesium chloride, their hydrates, and mixtures thereof, with calcium chloride and magnesium chloride being preferred, and calcium chloride being more preferred. Any and all hydrates of calcium chloride and magnesium chloride can be used in the present invention, as can anhydrous forms of calcium chloride and magnesium chloride. The basic compound used in the chemical leavening composition of the present invention is selected from a group of compounds which, when chemically reacted with the leavening acid, generates carbon dioxide gas as a result of the chemical reaction. The basic compound is basic in relation to the leavening acid, i.e., the basic compound chemically reacts with the leavening acid in an acid-base reaction. One skilled in the art will appreciate the specific basic compounds that will so react with the leavening acid. Examples of such basic compounds include, but are not limited to, ammonium bicarbonate, potassium bicarbonate, sodium bicarbonate, and mixtures thereof, with sodium bicarbonate being preferred. When the leavening acid is calcium chloride and the basic compound is sodium bicarbonate, the chemical leavening composition comprises from about 32% to about 44%, preferably from about 34% to about 42%, more preferably from about 36% to about 40% by weight calcium chloride, and from about 56% to about 68%, preferably from about 58% to about 66%, more preferably from about 60% to about 64% by weight sodium bicarbonate. When the leavening acid is magnesium chloride and the basic compound is sodium bicarbonate, the chemical leavening composition comprises from about 28% to about 40%, preferably from about 30% to about 38%, more preferably from about 32% to about 36% by weight magnesium chloride, and from about 60% to about 72%, preferably from about 62% to about 70%, more preferably from about 64% to about 68% by weight sodium bicarbonate.

The chemical leavening composition of the present invention may optionally contain additional chemical leavening acids known to those skilled in the art. However, even when such other chemical leavening acids are included in the chemical leavening composition of the present invention, the overall chemical leavening composition will be a balanced chemical leavening composition. Any chemical leavening acid known to those skilled in the art may be included as an additional chemical leavening acid in the chemical leavening composition of the present invention. Examples of such additional chemical leavening acids include, but are not limited to, anhydrous monocalcium phosphate, monocalcium phosphate monohydrate, anhydrous dicalcium phosphate, dicalcium phosphate dihydrate, sodium acid pyrophosphate, sodium aluminum phosphate, monoaluminum phosphate, dialuminum phosphate, and mixtures thereof, with sodium acid pyrophosphate and sodium aluminum phosphate being preferred.

The weight percentages and weight ratio for a particular chemical leavening composition having a particular leavening acid and a particular basic compound can be calculated by one skilled in the art from the knowledge of the particular leavening acid and basic compound used and the stoichiometric ratio. The weight ratio of leavening acid to basic compound is generally in the range of from about 1:1.1 to about 1:2.5, preferably from about 1:1.3 to about 1:2.3, more preferably from about 1:1.5 to about 1:2.1 (leavening acid-:basic compound). When the preferred calcium chloride leavening acid and preferred sodium bicarbonate basic compound are used in the present invention, the stoichiometric ratio of leavening acid to basic compound is in the range of from about 1:1.5 to about 1:2.5, preferably from about 1:1.7 to about 1:2.3, more preferably from about 1:1.9 to about 1:2.1 (calcium chloride:sodium bicarbonate), and the weight ratio of leavening acid to basic compound is in the range of from about 1:1 to about 1:2, preferably from about 1:1.2 to about 1:1.8, more preferably from about 1:1.4 to about 1:1.6 (calcium chloride:sodium bicarbonate).

The present invention further relates to an improved batter comprising from about 20% to about 50%, preferably from about 30% to about 45%, more preferably from about 35% to about 40% by weight flour, and from about 30% to about 65%, preferably from about 35% to about 60%, more preferably from about 35% to about 55% by weight water. The improved batter composition of the present invention further comprises from about 0.04% to about 2%, preferably from about 0.1% to about 1.5%, more preferably from about 0.15% to about 1.1% by weight of a leavening acid, and from about 0.05% to about 2.5%, preferably from about 0.13% to about 1.8%, more preferably from about 0.2% to about 1.4% by weight of a basic compound. The above weight percentages are expressed as a percentage of the batter composition. The leavening acid is as already described herein and is selected from the group consisting of calcium chloride, magnesium chloride, their hydrates, and mixtures thereof. The basic compound is as already described herein and is selected from one or more of a group of compounds which, when reacted chemically with said leavening acid, is capable of generating carbon dioxide gas. Such compounds will be known to those skilled in the art. Examples of basic compounds useful in the present invention are as already described herein for the chemical leavening composition of the present invention. As with the chemical leavening composition, the leavening acid and basic compound are present in the batter at a stoichiometric ratio of from about 1:1.5 to about 1:2.5, preferably from about 1:1.7 to about 1:2.3, more preferably from about 1:1.9 to about 1:2.1. The weight ratio of leavening acid to basic compound is as already described herein for the chemical leavening composition.

Of course, the particular ingredients, and particular proportions, comprising the improved batter composition of the present invention will depend upon the manner in which the batter is used. For example, a batter used to prepare waffles will have a different specific composition than a batter used to coat a deep fried food product. However, one skilled in the art will appreciate the types of ingredients, and the amount of each ingredient, that will be necessary to prepare the appropriate batter, with the exception of the amount of the chemical leavening composition of the present invention that is added to the batter. In the present invention, the preferred types of products prepared from the improved batter composition are waffles, pancakes, cakes, cup cakes, cookies, muffins, hush puppies, and doughnuts, with waffles and pancakes being preferred. Generally the batter compositions of the present invention will be formulated using the same ingredients at the same relative concentrations, with the possible exception of the chemical leavening composition, as normally prepared, i.e., when prepared using a known chemical leavening composition, and not the chemical leavening composition of the present invention. As such, one skilled in the art will appreciate the compositional makeup of a batter used to prepare a particular type of product, except for the use of the chemical leavening composition of the present invention.

Preferred waffle and pancake batter compositions of the present invention comprise flour and water. The preferred waffle and pancake batter compositions of the present invention further comprise a leavening acid selected from the group consisting of calcium chloride, magnesium chloride, their hydrates, and mixtures thereof, and a basic compound selected from one or more of a group of compounds which, when reacted chemically with said leavening acid, are capable of generating carbon dioxide gas.

Any type of flour known to those skilled in the art as being useful for preparing batter compositions may be used to prepare the improved batter composition of the present invention. Examples of such flours include, but are not limited to, all-purpose flour, hard wheat flour, soft wheat flour, corn flour, whole wheat flour, oat flour, rice flour, barley flour, and mixtures thereof. Of course, a specific type and amount of flour used in the improved batter composition may be preferred when a particular product is prepared using the improved batter of the present invention. Any type of flour known to those skilled in the art may be used to prepare the preferred waffle and pancake batter compositions of the present invention. Examples of such flours include, but are not limited to, all-purpose flour, hard wheat flour, soft wheat flour, corn flour, and mixtures thereof. The art, in the form of numerous cook books, teaches the use of all-purpose flour to prepare pancake and waffle compositions. The preferred waffle and pancake batter compositions of the present invention comprise from about 20% to about 50%, preferably from about 30% to about 45%, more preferably from about 35% to about 40% by weight flour.

The improved batter composition of the present invention further comprises a leavening acid and a basic compound. The stoichiometric ratio of said leavening acid to said basic compound is in the range of from about 1:1.5 to about 1:2.5, preferably from about 1:1.7 to about 1:2.3, more preferably from about 1:1.9 to about 1:2.1. As will be appreciated by one skilled in the art, the weight ratio of said leavening acid to said basic compound will depend upon the particular leavening acid and basic compound used in the improved batter composition. However, one skilled in the art will be able to readily calculate such weight ratio from the stoichiometric ratio and the molecular weights of the leavening acid and basic compound.

As with the chemical leavening composition of the present invention, the leavening acid of the improved batter composition of the present invention is a Lewis acid and is selected from the group consisting of calcium chloride, magnesium chloride, their hydrates, and mixtures thereof, with calcium chloride and magnesium chloride being preferred, and calcium chloride being more preferred. The basic compound of the improved batter composition of the present invention is selected from one or more of a group of compounds which, when reacted chemically with said leavening acid, are capable of generating carbon dioxide gas. The basic compound is basic in relation to the leavening acid, i.e., the basic compound chemically reacts with the leavening acid in an acid-base reaction. One skilled in the art will appreciate the specific basic compounds that will so react with the leavening acid. Examples of such basic compounds include, but are not limited to, ammonium bicarbonate, potassium bicarbonate, sodium bicarbonate, and mixtures thereof, with sodium bicarbonate being preferred. When the preferred calcium chloride leavening acid and sodium bicarbonate basic compound are used to prepare the preferred waffle and batter compositions of the present invention, such preferred waffle and pancake batter compositions typically comprise from about 0.05% to about 1.0%, preferably from about 0.1% to about 0.8%, more preferably from about 0.15% to about 0.7% by weight calcium chloride, and from about 0.05% to about 2.5%, preferably from about 0.13% to about 1.8%, more preferably from about 0.2% to about 1.4% by weight of the preferred sodium bicarbonate basic compound.

The improved batter composition of the present invention may optionally contain additional chemical leavening acids known to those skilled in the art. However, even when such other chemical leavening acids are included in the improved batter composition of the present invention, the overall amount of leavening acid in the improved batter composition will be stoichiometrically balanced with the overall amount of basic compound in the improved batter composition. Any chemical leavening acid known to those skilled in the art may be included as an additional chemical leavening acid in the improved batter composition of the present invention. Examples of such additional chemical leavening acids include, but are not limited to, anhydrous monocalcium phosphate, monocalcium phosphate monohydrate, anhydrous dicalcium phosphate, dicalcium phosphate dihydrate, sodium acid pyrophosphate, sodium aluminum phosphate, monoaluminum phosphate, dialuminum phosphate, and mixtures thereof, with sodium acid pyrophosphate and sodium aluminum phosphate being preferred.

The balance of the improved batter composition is water. Any water source known to those skilled in the art may be used for the improved batter composition of the present invention, including tap water. The preferred waffle batter composition typically comprises from about 35% to about 60%, preferably from about 40% to about 55%, more preferably from about 44% to about 48% by weight water. The preferred pancake batter composition typically comprises from about 30% to about 60%, preferably from about 35% to about 55%, more preferably from about 35% to about 45% by weight water.

The improved batter composition of the present invention may further comprise optional ingredients known to those skilled in the art as being useful in a batter composition. Examples of such optional ingredients include, but are not limited to, from 0% to about 10% by weight of an added protein source, from 0% to about 10% by weight of an added fat source, from 0% to about 10% by weight of an egg source, from 0% to about 2% by weight of an emulsifier, from 0% to about 0.05% by weight of a gum source, from 0% to about 8% by weight of a sweetening agent, from 0% to about 1.5% by weight salt, from 0% to about 0.1% by weight vitamins and minerals, from 0% to about 2% by weight natural and artificial coloring agents, and from 0% to about 2% by weight natural and artificial flavoring agents. Of course, the specific type and amount of such optional ingredients that will be used, if at all, in the improved batter composition of the present invention will depend upon the particular product being prepared from the improved batter composition.

Any type of added protein source used in a batter can be used in the improved batter composition of the present invention. Protein may also be contributed to the batter by other ingredients, including the flour and eggs. However, in addition to the protein inherent in the other batter ingredients, added protein may also be included in the improved batter composition, as provided for herein. The added protein is a soluble, heat-setting added protein that improves the texture of the final product by providing structural strength. The added protein can be provided by any protein source known to those skilled in the art. Examples of protein sources useful as the added protein ingredient in the improved batter composition of the present invention include, but are not limited to, whey powder, egg albumen, soy protein, vital wheat gluten, peanut protein, non-fat dry milk, and mixtures thereof, with soy protein being preferred for waffles. Of course, a specific type and amount of added protein source used in the improved batter composition may be preferred when a particular product is prepared using the improved batter of the present invention. For example, the preferred waffle batter composition of the present invention comprises from about 0.5% to about 5%, preferably from about 1.0% to about 4.0%, more preferably from about 2.5% to about 3.5% by weight of an added protein source. When the more preferred soy added protein source is used, the preferred waffle batter composition of the present invention comprises from about 0.5% to about 1.7%, preferably from about 0.8% to about 1.4%, more preferably from about 1.0% to about 1.2% by weight of the preferred soy added protein source. There is no preference for adding protein in the preferred improved pancake batter composition of the present invention. However, protein can be added if desired.

Any emulsifier known to those skilled in the art as being useful in preparing a batter composition can be used to prepare the improved batter composition of the present invention, including the preferred waffle and pancake batter compositions of the present invention. Examples of emulsifiers useful in the improved batter composition include, but are not limited to, propylene glycol monoester and diester, distilled mono- and diglycerides, sodium stearoyl lactylate, and silicon dioxide. Of course, as will be appreciated by one skilled in the art, the specific type and amount of emulsifier used in the improved batter composition may differ from one product to another. However, one skilled in the art will have knowledge of the type and amount of emulsifier that is useful when a particular type of product is prepared using the improved batter of the present invention.

The egg source of the improved batter composition of the present invention can provide protein for structure, lecithin for emulsification, and fat. However, these contributions by the egg source are not included in the weight percentages specified herein for the added emulsifier and fat. Examples of egg sources useful in the improved batter composition of the present invention include, but are not limited to, liquid and dried whole eggs and egg whites, with liquid whole eggs being preferred. The specific amount of whole egg source contained in the improved batter composition, while falling within the general parameters set forth above, will depend upon the particular type of egg source being utilized, and the particular baked product being prepared by the batter composition. Of course, as will be appreciated by one skilled in the art, the specific type and amount of egg source used in the improved batter composition may differ from one product to another. However, one skilled in the art will have knowledge of the type and amount of egg source that is useful when a particular type of product is prepared using the improved batter of the present invention.

Any type of added fat source used in a batter can be used in the improved batter composition of the present invention. Examples of useful separately added fat sources include, but are not limited to, liquid shortening, solid shortening selected from powder and/or plastic shortening, vegetable tallow; beef tallow, and mixtures thereof, with liquid shortening, solid shortening selected from powder and/or plastic shortening, and mixtures thereof being preferred, and liquid shortening being more preferred. If solid shortening selected from powder and/or plastic shortening is utilized, it should be added to the other dry ingredients used to prepare the batter first, and then the dry ingredients are added to separately prepared liquid ingredients to form the batter composition. Of course, as will be appreciated by one skilled in the art, the specific type and amount of fat source used in the improved batter composition may differ from one product to another. However, one skilled in the art will have knowledge of the type and amount of fat source that is useful when a particular type of product is prepared using the improved batter of the present invention.

It is believed that any type of gum known to those skilled in the art may be used in the improved batter composition of the present invention. Examples of gums include, but are not limited to, xanthan gum, guar gum, and carboxymethylcellulose gum. Of course, as will be appreciated by one skilled in the art, the specific type and amount of gum used in the improved batter composition may differ from one product to another. However, one skilled in the art will have knowledge of the type and amount of gum that is useful when a particular type of product is prepared using the improved batter of the present invention.

It is believed that any type of sweetening agent known to those skilled in the art may be used in the improved batter composition of the present invention. Examples of sweetening agents include, but are not limited to, sucrose, dextrose, maltose and high fructose corn syrup. Of course, as will be appreciated by one skilled in the art, the specific type and amount of sweetening agent used in the improved batter composition may differ from one product to another. However, one skilled in the art will have knowledge of the type and amount of sweetening agent that is useful when a particular type of product is prepared using the improved batter of the present invention.

Any method of preparing batter compositions known to those skilled in the art may be used to prepare the improved batter composition of the present invention, except the art does not teach the addition of calcium chloride, magnesium chloride, their hydrates, and mixtures thereof, as a chemical leavening acid in a batter composition. However, the manner of addition of such chemical leavening acid to the other batter ingredients is not critical. What is critical is that such chemical leavening acid is added to the batter composition at all. The chemical leavening acid of the present invention can be first dry mixed with other dry ingredients, including the basic compound, to prepare a dry mixture, which is then combined with the wet ingredients and mixed to form the batter composition of the present invention. Alternatively, the chemical leavening acid of the present invention can be added to the liquid ingredients individually and separately from the other, combined dry ingredients. Another method is to add all the dry ingredients separately to the liquid ingredients. Still another method is to combine all the ingredients, wet and dry, together without regard for the order of addition.

When the batter composition ingredients are combined, they are combined in proportions sufficient to provide a batter having the ingredient ratios as already described above. Regardless of the preparation method used, when the ingredients are combined, they are preferably mixed in such a manner to provide for a substantially homogeneous mixture. By "substantially homogeneous mixture" it is meant that the individual ingredients are distributed substantially uniformly throughout the batter composition. This is typically accomplished by mixing the ingredients using agitation equipment. Examples of useful agitation equipment include, but are not limited to, a blender, a mixer, and a vacuum transfer batter mixer, with the vacuum transfer batter mixer being preferred.

The present invention further relates to an improved dough comprising from about 30% to about 70%, preferably from about 35% to about 60%, more preferably from about 40% to about 50% by weight flour; from 0% to about 6%, preferably from about 0.5% to about 4.5%, more preferably from about 1.0% to about 2.5% by weight yeast; and from about 18% to about 45%, preferably from about 22% to about 40%, more preferably from about 25% to about 40% by weight water. The improved dough composition of the present invention further comprises from about 0.04% to about 2%, preferably from about 0.1% to about 1.7%, more preferably from about 0.2% to about 1.5% by weight of a leavening acid, and from about 0.05% to about 2.5%, preferably from about 0.13% to about 2.2%, more preferably from about 0.25% to about 2% by weight of a basic compound. The above weight percentages are expressed as a percentage of the dough composition. The leavening acid is as already described herein and is selected from the group consisting of calcium chloride, magnesium chloride, their hydrates, and mixtures thereof. The basic compound is as already described herein and is selected from one or more of a group of compounds which, when reacted chemically with said leavening acid, is capable of generating carbon dioxide gas. Such compounds will be known to those skilled in the art. Examples of basic compounds useful in the present invention are as already described herein for the chemical leavening composition of the present invention. As with the chemical leavening composition, the leavening acid and basic compound are present in the dough at a stoichiometric ratio of from about 1:1.5 to about 1:2.5, preferably from about 1:1.7 to about 1:2.3, more preferably from about 1:1.9 to about 1:2.1. The weight ratio of leavening acid to basic compound can be determined by one skilled in the art knowing the stoichiometric ratio and molecular weight of the leavening acid and basic compound.

Of course, the particular ingredients, and particular proportions, comprising the improved dough composition of the present invention will depend upon the manner in which the dough is used. For example, a dough used to prepare pizza crusts will have a different specific composition than a dough used to prepare biscuits. However, one skilled in the art will appreciate the types of ingredients, and the amount of each ingredient, that will be necessary to prepare the appropriate dough, with the exception of the amount of the chemical leavening composition of the present invention that is added to the dough. In the present invention, the preferred types of products prepared from the improved dough composition are pizza crusts, biscuits, rolls, bagels, doughnuts, and bread, with pizza crusts, and biscuits being preferred. Generally the dough compositions of the present invention will be formulated using the same ingredients at the same relative concentrations, with the possible exception of the chemical leavening composition, as normally prepared, i.e., when prepared using a known chemical leavening composition, and not the chemical leavening composition of the present invention. As such, one skilled in the art will appreciate the compositional make-up of a dough used to prepare a particular type of product, except for the use of the chemical leavening composition of the present invention.

Any type of flour known to those skilled in the art as being useful for preparing dough compositions may be used to prepare the improved dough composition of the present invention. Examples of such flours include, but are not limited to, all-purpose flour, hard wheat flour, soft wheat flour, and corn flour, and mixtures thereof, with allpurpose flour, hard wheat flour, soft wheat flour, and mixtures thereof being preferred, and hard and soft wheat flour being more preferred. Of course, as will be appreciated by one skilled in the art, the specific type and amount of flour used in the improved dough composition may differ from one product to another. However, one skilled in the art will have knowledge of the type and amount of flour that is useful when a particular type of product is prepared using the improved dough of the present invention. The preferred pizza crust dough composition of the present invention comprises from about 50% to about 65%, preferably from about 55% to about 60% by weight flour. The preferred biscuit dough composition of the present invention comprises from about 35% to about 60%, preferably from about 35% to about 55%, more preferably from about 40% to about 45% by weight flour.

The improved dough composition of the present invention further comprises the leavening acid of the present invention selected from the group consisting of calcium chloride, magnesium chloride, their hydrates, and mixtures thereof, and the basic compound of the present invention selected from the group of compounds which, when chemically reacted with the leavening acid, generate carbon dioxide gas as a result of the chemical reaction. The stoichiometric ratio of said leavening acid to said basic compound is in the range of from about 1:1.5 to about 1:2.5, preferably from about 1:1.7 to about 1:2.3, more preferably from about 1:1.9 to about 1:2.1. As will be appreciated by one skilled in the art, the weight ratio of the leavening acid and basic compound will depend upon the particular leavening acid and basic compound used in the improved dough composition. One skilled in the art will appreciate the specific basic compounds that will so react with the leavening acid. Examples of such basic compounds include, but are not limited to, ammonium bicarbonate, potassium bicarbonate, sodium bicarbonate, and mixtures thereof, with sodium bicarbonate being preferred. When the preferred calcium chloride leavening acid and sodium bicarbonate basic compound are used to prepare the preferred pizza crust dough composition of the present invention, such preferred pizza crust dough composition typically comprises from about 0.04% to about 2%, preferably from about 0.1% to about 1.7%, more preferably from about 0.2% to about 1.5% by weight calcium chloride, and from about 0.05% to about 2.5%, preferably from about 0.13% to about 2.2%, more preferably from about 0.25% to about 2% by weight sodium bicarbonate. When the preferred calcium chloride leavening acid and sodium bicarbonate basic compound are used to prepare the preferred biscuit dough composition of the present invention, such preferred biscuit dough composition typically comprises from about 0.5% to about 2%, preferably from about 0.6% to about 1.7%, more preferably from about 0.7% to about 1.5% by weight calcium chloride, and from about 0.7% to about 2.5%, preferably from about 0.8% to about 2.2%, more preferably from about 0.9% to about 2% by weight sodium bicarbonate.

The improved dough composition of the present invention may optionally contain additional chemical leavening acids known to those skilled in the art. However, even when such other chemical leavening acids are included in the improved dough composition of the present invention, the overall amount of leavening acid in the improved dough composition will be stoichiometrically balanced with the overall amount of basic compound in the improved dough composition. Any chemical leavening acid known to those skilled in the art may be included as an additional chemical leavening acid in the improved dough composition of the present invention. Examples of such additional chemical leavening acids include, but are not limited to, anhydrous monocalcium phosphate, monocalcium phosphate monohydrate, anhydrous dicalcium phosphate, dicalcium phosphate dihydrate, sodium acid pyrophosphate, sodium aluminum phosphate, monoaluminum phosphate, dialuminum phosphate, and mixtures thereof, with sodium acid pyrophosphate and sodium aluminum phosphate being preferred.

The improved dough composition of the present invention further comprises yeast. Any yeast known to those skilled in the art as being useful for preparing a dough composition can be used to prepare the improved dough composition of the present invention. Examples of yeast useful in the present invention include, but are not limited to, compressed yeast, active dry yeast, and instantized yeast, with compressed yeast being preferred. Of course, as will be appreciated by one skilled in the art, the specific type and amount of yeast used in the improved dough composition may differ from one product to another. However, one skilled in the art will have knowledge of the type and amount of yeast that is useful when a particular type of product is prepared using the improved dough of the present invention. The preferred pizza crust dough composition of the present invention comprises from 0% to about 2.5%, preferably from about 0.5% to about 2.0%, more preferably from about 1.0% to about 1.5% by weight yeast. The preferred biscuit dough composition of the present invention does not contain yeast, but is leavened by the chemical leavening acid and basic compound of the present invention.

The balance of the improved dough composition is water. Any water source known to those skilled in the art may be used for the improved dough composition of the present invention, including tap water. The preferred pizza crust dough composition typically comprises from about 18% to about 40%, preferably from about 22% to about 35%, more preferably from about 25% to about 30% by weight water. The preferred biscuit dough composition typically comprises from about 25% to about 45%, preferably from about 30% to about 40%, more preferably from about 32% to about 38% by weight water.

The improved dough composition of the present invention may further comprise optional ingredients known to those skilled in the art as being useful in a dough composition. Examples of such optional ingredients include, but are not limited to, from 0% to about 15% by weight of an added fat source, from 0% to about 5% by weight of an egg source, from 0% to about 2% by weight of an added protein source, from 0% to about 2% of an emulsifier, from 0% to about 3% by weight of a sweetening agent, from 0% to about 1.5% by weight salt, from 0% to about 1% by weight natural and artificial coloring agents, and from 0% to about 2% by weight natural and artificial flavoring agents. Of course, the specific type and amount of such optional ingredients that will be used, if at all, in the improved dough composition of the present invention will depend upon the particular product being prepared from the improved dough composition.

Any emulsifier known to those skilled in the art as being useful in preparing a dough composition can be used to prepare the improved dough composition of the present invention, including the preferred pizza crust and biscuit dough compositions of the present invention. Examples of emulsifiers useful in the improved dough composition include, but are not limited to, propylene glycol monoester and diester, distilled mono- and diglycerides, sodium stearoyl lactylate, and silicon dioxide. Of course, as will be appreciated by one skilled in the art, the specific type and amount of emulsifier used in the improved dough composition may differ from one product to another. However, one skilled in the art will have knowledge of the type and amount of emulsifier that is useful when a particular type of product is prepared using the improved dough of the present invention.

The egg source of the improved dough composition of the present invention can provide protein for structure, lecithin for emulsification, and fat. However, these contributions by the egg source are not included in the weight percentages specified herein for the added emulsifier and fat. Examples of egg sources useful in the improved dough composition of the present invention include, but are not limited to, liquid and dried whole eggs and egg whites. Of course, as will be appreciated by one skilled in the art, the specific type and amount of egg source used in the improved dough composition may differ from one product to another. However, one skilled in the art will have knowledge of the type and amount of egg source that is useful when a particular type of product is prepared using the improved dough of the present invention.

Any type of added fat source used in a dough can be used in the improved dough composition of the present invention.

Examples of useful separately added fat sources include, but are not limited to, liquid shortening, solid shortening selected from powder and/or plastic shortening, vegetable tallow, beef tallow, and mixtures thereof, with liquid shortening, solid shortening selected from powder and/or plastic shortening, and mixtures thereof being preferred, and a mixture of solid and liquid shortening being more preferred. If solid shortening selected from powder and/or plastic shortening is utilized, it should be added to the other dry ingredients used to prepare the dough first, and then the dry ingredients are added to separately prepared liquid ingredients to form the dough composition. Of course, as will be appreciated by one skilled in the art, the specific type and amount of added fat source used in the improved dough composition may differ from one product to another. However, one skilled in the art will have knowledge of the type and amount of added fat source that is useful when a particular type of product is prepared using the improved dough of the present invention.

Any type of added protein source used in a dough can be used in the improved dough composition of the present invention. Protein may also be contributed to the dough by other ingredients, including the flour and eggs. However, in addition to the protein inherent in the other dough ingredients, added protein may also be included in the improved dough composition, as provided for herein. The added protein is a soluble, heat-setting added protein that improves the texture of the final product by providing structural strength. The added protein can be provided by any protein source known to those skilled in the art. Examples of protein sources useful as the added protein ingredient in the improved dough composition of the present invention include, but are not limited to, whey powder, egg albumen, soy protein, vital wheat gluten, peanut protein, non-fat dry milk, and mixtures thereof. Of course, as will be appreciated by one skilled in the art, the specific type and amount of added protein source used in the improved dough composition may differ from one product to another. However, one skilled in the art will have knowledge of the type and amount of added protein source that is useful when a particular type of product is prepared using the improved dough of the present invention.

It is believed that any type of sweetening agent known to those skilled in the art may be used in the improved dough composition of the present invention. Examples of sweetening agents include, but are not limited to, sucrose, dextrose, maltose, and high fructose corn syrup. Of course, as will be appreciated by one skilled in the art, the specific type and amount of sweetening agent used in the improved dough composition may differ from one product to another. However, one skilled in the art will have knowledge of the type and amount of sweetening agent that is useful when a particular type of product is prepared using the improved dough of the present invention.

Any method of preparing dough compositions known to those skilled in the art may be used to prepare the improved dough composition of the present invention, except the art does not teach the addition of calcium chloride, magnesium chloride, their hydrates, and mixtures thereof, as a chemical leavening acid in a dough composition. However, the manner of addition of such chemical leavening acid to the other dough ingredients is not critical. What is critical is that such chemical leavening acid is added to the improved dough composition at all. The chemical leavening acid of the present invention can be first dry mixed with other dry ingredients, including the basic compound, to prepare a dry mixture, which is then combined with the wet ingredients and mixed to form the dough composition of the present invention. Alternatively, the chemical leavening acid of the present invention can be added to the liquid ingredients individually and separately from the other, combined dry ingredients. Another method is to add all the dry ingredients separately to the liquid ingredients. Still another method is to combine all the ingredients, wet and dry, together without regard for the order of addition.

When the dough composition ingredients are combined, they are combined in proportions sufficient to provide a dough having the ingredient ratios as already described above. Regardless of the preparation method used, when the ingredients are combined, they are preferably mixed in such a manner to provide for a substantially homogeneous mixture. By "substantially homogeneous mixture" it is meant that the individual ingredients are distributed substantially uniformly throughout the dough composition. This is typically accomplished by mixing the ingredients using agitation equipment. Examples of useful agitation equipment include, but are not limited to, a dough kneading blender, a horizontal bar mixer, and a sigma mixer, with a dough kneading blender being preferred.

The present invention further comprises a method of chemically leavening both a batter and a dough composition. The claimed method comprises adding a balanced chemical leavening system to a batter or dough composition in an amount effective to leaven said batter or dough. The balanced chemical leavening system is the same balanced leavening composition already described herein. The claimed method of the present invention can also be effectuated by preparing the batter or dough compositions of the present invention, the batter or dough composition having the same make-up as already described herein, including ingredients and optional ingredients, the leavening acid and basic compound, and respective weight percentages. The batter or dough composition may be prepared by the methods described herein.

The balanced chemical leavening composition of the present invention is added to a dough or batter in the manner already described herein to the other batter or dough composition ingredients. The balanced chemical leavening composition may be added in an admixture, i.e., an admixture of leavening acid and basic compound, or the components of the balanced chemical leavening acid, i.e., the leavening acid and basic compound, may be added to the dough or batter mixture separately. In either event, the final stoichiometric ratio of leavening acid to basic compound in the batter or dough composition will be as already described herein, i.e., in the range of from about 1:1.5 to about 1:2.5, preferably from about 1:1.7 to about 1:2.3, more preferably from about 1:1.9 to about 1:2.1.

While not intending to be bound by theory, it is surprising and unexpected that calcium chloride, magnesium chloride, their hydrates, and mixtures thereof can be used as a leavening acid in the preparation of baked good products from batter and dough compositions.

The present invention is further illustrated, but not limited by, the following examples.

EXAMPLES

Example 1

An improved waffle batter composition is prepared as follows. A dry mixture is prepared by combining in a first bowl 2250 grams of sifted all-purpose flour with 5 grams salt, 40 grams calcium chloride as a leavening acid, and 60 grams of baking soda, which acts as a basic compound to the leavening acid and generates $CO_2$ gas when it chemically reacts with the leavening acid. These dry ingredients are sifted together in the first bowl. A liquid mixture is then prepared by combining in a second bowl 1000 grams of whole liquid eggs are combined with 4200 grams of milk and 250 grams of liquid shortening. The liquid mixture is then stirred into the dry ingredients and mixed together to form a batter. The batter is beaten with a rotary beater until it is smooth.

The batter is then poured onto the center of the bottom plate of a hot waffle iron. The waffle iron is hot enough if water skitters around before evaporating. The batter is poured until the entire surface of the bottom plate of the waffle iron is covered. The upper plate of the waffle iron is then closed onto the batter. The waffles are baked until steaming stops. The upper lid is then lifted and the waffles are removed from the waffle iron.

Example 2

An improved pizza crust dough composition is prepared as follows. In a first bowl prepare an initial aqueous mixture by dispersing 5 grams of compressed yeast in 110 grams of water at a temperature of 110° F. In a separate second bowl prepare a dry mixture by combining 225 grams of sifted all-purpose flour, 7 grams of sugar, 50 grams of shortening, 3 grams calcium chloride as a leavening acid, and 4.5 grams of baking soda, which acts as a basic compound to the leavening acid and generates CO2 gas when it chemically reacts with the leavening acid. The dry mixture is then blended into the initial aqueous mixture, thereby preparing a dough. Knead the dough on a lightly floured surface. Place the kneaded dough into a greased bowl, turn to grease top. Cover and let rise in a warm place (85° F.) until the volume is doubled (1 ½–2 hr.). Divide the risen dough into 3 parts, and roll into three 10" circles. Place the circles on separate pizza pans, and cover with a pizza topping. Bake the pizzas for 25–30 minutes at a temperature of 425° F.

What is claimed is:

1. A chemical leavening composition useful for leavening a batter or dough, which chemical leavening composition comprises from about 20% to about 50% by weight of a leavening acid selected from the group consisting of calcium chloride, magnesium chloride, their hydrates, and mixtures thereof, and from about 50% to about 80% by weight of a basic compound, wherein said basic compound is selected from one or more of a group of compounds which, when reacted chemically with said leavening acid, are capable of generating carbon dioxide gas, wherein the stoichiometric ratio of said leavening acid to said basic compound is in the range of from about 1:1.5 to about 1:2.5, and wherein said weight percentages are expressed as a percentage of the chemical leavening composition.

2. A chemical leavening composition according to claim 1 wherein said basic compound is selected from the group consisting of ammonium bicarbonate, potassium bicarbonate, sodium bicarbonate, and mixtures thereof.

3. A chemical leavening composition according to claim 2 wherein said chemical leavening composition comprises from about 25% to about 45% by weight of said leavening acid, and from about 55% to about 75% by weight of said basic compound, and wherein the stoichiometric ratio of said leavening acid to said basic compound is in the range of from about 1:1.7 to about 1:2.3.

4. A chemical leavening composition according to claim 3 wherein said chemical leavening composition comprises from about 36% to about 40% by weight of said leavening acid, and from about 60% to about 64% by weight of said basic compound, wherein said leavening acid is calcium chloride and said basic compound is sodium bicarbonate, and wherein the stoichiometric ratio of calcium chloride to sodium bicarbonate is in the range of from about 1:1.9 to about 1:2.1.

5. A method of chemically leavening a batter or dough, which method comprises adding a balanced chemical leavening system to said batter or dough in an amount sufficient to leaven said batter or dough, wherein said balanced chemical leavening system comprises a leavening acid selected from the group consisting of calcium chloride, magnesium chloride, their hydrates, and mixtures thereof, and a basic compound selected from a group of compounds which, when reacted chemically with said leavening acid, are capable of generating carbon dioxide gas, and wherein the stoichiometric ratio of said leavening acid to said basic compound is in the range of from about 1:1.5 to about 1:2.5.

6. A method according to claim 5 wherein a batter is chemically leavened, wherein from about 0.04% to about 2% by weight of a leavening acid and from about 0.05% to about 2.5% by weight of a basic compound are added to said batter, and wherein said weight percentages are expressed as a percentage of the batter composition being chemically leavened.

7. A method according to claim 6 wherein said batter is a waffle batter, said leavening acid is calcium chloride, and said basic compound is sodium bicarbonate.

8. A method according to claim 7 wherein said waffle batter comprises from about 0.1% to about 0.8% by weight calcium chloride and from about 0.13% to about 1.8% by weight sodium bicarbonate, wherein the stoichiometric ratio of said leavening acid to said basic compound is in the range of from about 1:1.7 to about 1:2.3, and wherein said weight percentages are expressed as a percentage of the waffle batter composition being chemically leavened.

9. A method according to claim 6 wherein said batter is a pancake batter, said leavening acid is calcium chloride, and said basic compound is sodium bicarbonate.

10. A method according to claim 9 wherein said pancake batter comprises from about 0.1% to about 0.8% by weight calcium chloride and from about 0.13% to about 1.8% by weight sodium bicarbonate, wherein the stoichiometric ratio of said leavening acid to said basic compound is in the range of from about 1:1.7 to about 1:2.3, and wherein said weight percentages are expressed as a percentage of the pancake batter composition being chemically leavened.

11. A method according to claim 5 wherein a dough is chemically leavened, wherein from about 0.04% to about 2% by weight of a leavening acid and from about 0.05% to about 2.5% by weight of a basic compound are added to said dough, and wherein said weight percentages are expressed as a percentage of the dough composition being chemically leavened.

12. A method according to claim 11 wherein said dough is a pizza crust dough, said leavening acid is calcium chloride, and said basic compound is sodium bicarbonate.

13. A method according to claim 12 wherein said pizza crust dough comprises from about 0.1% to about 1.7% by weight calcium chloride and from about 0.13% to about 2.2% by weight sodium bicarbonate, wherein the stoichiometric ratio of said leavening acid to said basic compound is in the range of from 1:1.7 to about 1:2.3, and wherein said weight percentages are expressed as a percentage of the pizza crust dough composition being chemically leavened.

14. A method according to claim 11 wherein said dough is a biscuit dough, said leavening acid is calcium chloride, and said basic compound is sodium bicarbonate.

15. A method according to claim 14 wherein said dough comprises from about 0.6% to about 1.7% by weight calcium chloride and from about 0.8% to about 2.2% by weight sodium bicarbonate, wherein the stoichiometric ratio of said leavening acid to said basic compound is in the range of from about 1:1.7 to about 1:2.3, and wherein said weight percentages are expressed as a percentage of the biscuit dough composition being chemically leavened.

16. A batter composition comprising from about 20% to about 50% by weight flour, and from about 30% to about 65% by weight water, wherein the improvement comprises from about 0.04% to about 2% by weight of a leavening acid, and from about 0.05% to about 2.5% by weight of a basic compound, wherein said leavening acid is selected from the group consisting of calcium chloride, magnesium chloride, their hydrates, and mixtures thereof, wherein said basic compound is selected from one or more of a group of basic compounds which, when reacted chemically with said leavening acid, are capable of generating carbon dioxide gas, wherein the stoichiometric ratio of said leavening acid to said basic compound is in the range of from about 1:1.5 to about 1:2.5, and wherein all weight percentage are expressed as a weight percentage of said batter composition.

17. A batter composition according to claim 16 wherein said basic compound is selected from the group consisting of ammonium bicarbonate, potassium bicarbonate, sodium bicarbonate, and mixtures thereof.

18. A batter composition according to claim 17 wherein said batter composition is a waffle batter composition and wherein said waffle batter comprises from about 30% to about 45% by weight flour; from about 1.0% to about 4.0% by weight of an added protein source; from about 40% to about 55% by weight water; from about 0.1% to about 0.8% by weight leavening acid; and from about 0.13% to about 1.8% by weight basic compound, wherein the stoichlometric ratio of said leavening acid to said basic compound is in the range of from about 1:1.7 to about 1:2.3, and further comprising from 0% to about 10% of an added fat source; from 0% to about 10% of an egg source; from 0% to about 2% by weight of an emulsifier; from 0% to about 1.5% by weight salt; from 0% to about 8% by weight of a sweetening agent; from 0% to about 0.1% by weight vitamins and minerals; from 0% to about 2% by weight natural and artificial coloring agents; and from 0% to about 2% by weight natural and artificial flavoring agents.

19. A batter composition according to claim 18 wherein said leavening acid is calcium chloride and said basic compound is sodium bicarbonate.

20. A batter composition according to claim 17 wherein said batter composition is a pancake batter composition and wherein said pancake batter comprises from about 30% to about 45% by weight flour; from about 35% to about 55% by weight water; from about 0.1% to about 0.8% by weight leavening acid; and from about 0.13% to about 1.8% by weight of said basic compound, wherein the stoichiometric ratio of said leavening acid to said basic compound is in the range of from about 1:1.7 to about 1:2.3. and further comprising from 0% to about 10% of an added fat source; from 0% to about 10% of an egg source; from 0% to about 2% by weight of an emulsifier; from 0% to about 1.5% by weight salt; from 0% to about 8% by weight of a sweetening agent; from 0% to about 0.1% by weight vitamins and minerals; from 0% to about 2% by weight natural and artificial coloring agents; and from 0% to about 2% by weight natural and artificial flavoring agents.

21. A batter composition according to claim 20 wherein said leavening acid is calcium chloride and said basic compound is sodium bicarbonate.

22. A dough composition comprising from about 30% to about 70% by weight flour; from 0% to about 6% by weight yeast; and from about 18% to about 45% by weight water, wherein the improvement comprises from about 0.04% to about 2% by weight of a leavening acid; and from about 0.05% to about 2.5% by weight of a basic compound, wherein said leavening acid is selected from the group consisting of calcium chloride, magnesium chloride, their hydrates, and mixtures thereof, wherein said basic compound is selected from one or more of a group of basic compounds which, when reacted chemically with said leavening acid, are capable of generating carbon dioxide gas, wherein the stoichiometric ratio of said leavening acid to said basic compound is in the range of from about 1:1.5 to about 1:2.5, and wherein all weight percentage are expressed as a weight percentage of said dough composition.

23. A dough composition according to claim 22 wherein said basic compound is selected from the group consisting of ammonium bicarbonate, potassium bicarbonate, sodium bicarbonate, and mixtures thereof.

24. A dough composition according to claim 23 wherein said dough composition is a pizza crust dough composition and wherein said pizza crust dough comprises from about 55% to about 60% by weight flour; from about 0.5% to about 2.0% by weight yeast; from about 22% to about 35% by weight water; from about 0.1% to about 1.7% by weight leavening acid; and from about 0.13% to about 2.2% by weight of said basic compound, wherein the stoichiometric ratio of said leavening acid to said basic compound is in the range of from about 1:1.7 to about 1:2.3. and further comprising from 0% to about 2% by weight of an added protein source; from 0% to about 15% of an added fat source; from 0% to about 5% of an egg source; from 0% to about 2% by weight of an emulsifier; from 0% to about 1.5% by weight salt; from 0% to about 3% by weight of a sweetening agent; from 0% to about 1% by weight natural and artificial coloring agents; and from 0% to about 2% by weight natural and artificial flavoring agents.

25. A dough composition according to claim 24 wherein said leavening acid is calcium chloride and said basic compound is sodium bicarbonate.

26. A dough composition according to claim 23 wherein said dough composition is a biscuit dough composition and wherein said biscuit dough comprises from about 35% to about 55% by weight flour; from about 30% to about 40% by weight water; from about 0.6% to about 1.7% by weight leavening acid; and from about 0.8% to about 2.2% by weight of said basic compound, wherein the stoichiometric ratio of said leavening acid to said basic compound is in the range of from about 1:1.7 to about 1:2.3. and further comprising from 0% to about 2% by weight of an added protein source; from 0% to about 15% of an added fat source; from 0% to about 5% of an egg source; from 0% to about 2% by weight of an emulsifier; from 0% to about 1.5% by weight salt; from 0% to about 3% by weight of a sweetening agent; from 0% to about 1% by weight natural and artificial coloring agents; and from 0% to about 2% by weight natural and artificial flavoring agents.

27. A dough composition according to claim 26 wherein said leavening acid is calcium chloride and said basic compound is sodium bicarbonate.

* * * * *